(12) United States Patent
Jang

(10) Patent No.: US 7,769,369 B2
(45) Date of Patent: Aug. 3, 2010

(54) MOBILE COMMUNICATION SYSTEM AND METHOD FOR PROVIDING PHONE NUMBER MAINTAINING SERVICE

(75) Inventor: Young-Geun Jang, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 625 days.

(21) Appl. No.: 10/785,264

(22) Filed: Feb. 23, 2004

(65) Prior Publication Data

US 2004/0166893 A1  Aug. 26, 2004

(30) Foreign Application Priority Data

Feb. 26, 2003 (KR) .................. 10-2003-0011902

(51) Int. Cl.
*H04M 3/00* (2006.01)
*H04M 7/00* (2006.01)
*H04W 4/00* (2009.01)
*H04W 40/00* (2009.01)

(52) U.S. Cl. .................. 455/418; 455/461; 455/445; 379/221.13

(58) Field of Classification Search .................. 455/418, 455/419, 423, 436, 456.6, 650, 561, 438, 455/442, 560; 379/221.13
See application file for complete search history.

(56) References Cited

U.S. PATENT DOCUMENTS

| | | | |
|---|---|---|---|
| 5,881,145 A * | 3/1999 | Giuhat et al. .......... | 379/221.13 |
| 6,064,887 A | 5/2000 | Kallioniemi et al. | |
| 6,240,293 B1 * | 5/2001 | Koster .................. | 455/445 |
| 6,738,633 B2 | 5/2004 | Kim et al. | |
| 2002/0107011 A1 * | 8/2002 | Mazzarella et al. ........ | 455/419 |
| 2003/0120553 A1 * | 6/2003 | Williams ................. | 705/26 |
| 2003/0134660 A1 * | 7/2003 | Himmel et al. .......... | 455/557 |
| 2004/0242243 A1 * | 12/2004 | Luis ..................... | 455/461 |

FOREIGN PATENT DOCUMENTS

| | | |
|---|---|---|
| KR | 1020000049276 | 7/2000 |
| KR | 1020020034413 | 5/2002 |

* cited by examiner

*Primary Examiner*—George Eng
*Assistant Examiner*—Wesley L Kim
(74) *Attorney, Agent, or Firm*—The Farrell Law Firm, LLP

(57) ABSTRACT

A mobile communication system provides a phone number maintaining service. In the system, a first mobile switching center (MSC) receives a call request signal with calling terminal information and called terminal information, detects an initial service provider of a called terminal from the called terminal information, and transmits the call request signal to a communication network formed by the detected initial service provider of the called terminal. A second MSC detects a changed service provider of the called terminal based on the called terminal information included in the call request signal transmitted from the first MSC, and transmits the call request signal to a communication network formed by the detected service provider. A third MSC transmits the call request signal received from the second MSC to the called terminal so that the called terminal can communicate with the calling terminal over a communication network formed by the changed service provider.

4 Claims, 4 Drawing Sheets

| SERIAL NUMBER (K) | SPCID (A) | SPID (B) | MIN (C) |
|---|---|---|---|
| K1 | 00 | 016 | 1234-5678 |
| K2 | 11 | 017 | 9530-6398 |
| K3 | 05 | 011 | 2345-6789 |
| K4 | 13 | 019 | 4567-8910 |
| ⋮ | ⋮ | ⋮ | ⋮ |

FIG.4

MOBILE COMMUNICATION SYSTEM AND METHOD FOR PROVIDING PHONE NUMBER MAINTAINING SERVICE

PRIORITY

This application claims priority under 35 U.S.C. §119 to an application entitled "Mobile Communication System and Method Capable of Providing Service For Using Continuously The Preallotted Phone-Number Regardless Of Changed Service-Provided" filed in the Korean Industrial Property Office on Feb. 26, 2003 and assigned Serial No. 2003-11902, the contents of which is incorporated herein by reference.

BACKGROUND OF THE INVENTION

1. Field of the Invention

The present invention relates generally to a mobile communication system and method for providing a phone number maintaining service, and in particular, to a mobile communication system and method capable of changing a service provider or a service type while continuously maintaining a phone number previously assigned to a mobile terminal in spite of a change in service provider for the mobile terminal.

2. Description of the Related Art

Generally, in order to receive a mobile communication service provided by a service provider, a user subscribes to a desired mobile communication service provided from the service provider, using his or her mobile terminal. In this case, the service provider stores, in the user's mobile terminal, information necessary for providing the corresponding mobile communication service. Such information is used by the mobile terminal to perform a call service through a service provider network. The "service provider network" refers to a communication network set up by a service provider so that the mobile terminal can perform a mobile communication service.

The information stored in the mobile terminal for a mobile communication service is called NAM (Number Assignment Module) information. The NAM information includes a mobile identification number (MIN) and a service provider identification number (SPID). The mobile identification number is used by a service provider to uniquely identify a mobile terminal, and the service provider identification number indicates a selected service provider.

Conventionally, when a user wishes to change a current service provider, the user must discard a current service provider identification number of the current service provider, and then store a new service provider identification number of a new service provider that provides a new mobile phone service. However, it is troublesome for both the user and the service provider to change the service provider identification number stored in the mobile terminal. In addition, after changing the service provider, the user must inconveniently inform his or her acquaintances of the change in the service provider. Therefore, there have been many demands for a method capable of allowing a user to continuously use the current service provider identification number although the user changes the service provider.

Meanwhile, due to the introduction of free competition into the communication business and removal of barriers between communication companies, phone number resources have a tendency toward opening, centering around advanced countries. Accordingly, a new service provider who wishes to enter the communication business is required to allow the user to continuously use a phone number assigned by the previous service provider. In addition, even the existing service provider proposes a method for allowing the user to continuously use a phone number previously assigned by another service provider regardless of a change in service provider.

Recently, there have been proposed various services provided to allow a user to continuously use a previously assigned phone number in spite of a change in service provider. However, such proposals require interlinking among communication networks and enormous expense for the interlinking, and cause a complexity problem. In addition, as boarders between nations or between service providers in terms of the communication business becomes obscure, the respective nations and service providers have different interests in various parts such as administrative regulation, mediation, service method, opinion decision, etc. Therefore, it is difficult to standardize and realize the proposed inter-service provider phone number maintaining service.

SUMMARY OF THE INVENTION

It is, therefore, an object of the present invention to provide a mobile communication system and method for providing a phone number maintaining service capable of allowing a user to continuously use a previously assigned phone number in spite of a change in service provider.

It is another object of the present invention to provide a mobile communication system and method for minimizing expenses required to provide a phone number maintaining service capable of allowing a user to continuously use a previously assigned phone number regardless of a change in service provider.

To achieve the above and other objects, there is provided a mobile communication system for providing a phone number maintaining service capable of allowing a user to continuously use a previously assigned phone number regardless of a change in service provider. In the system, a first mobile switching center (MSC) receives a call request signal with calling terminal information and called terminal information, detects an initial service provider of a called terminal from the called terminal information, and transmits the call request signal to a communication network formed by the detected initial service provider of the called terminal. A second MSC detects a changed service provider of the called terminal based on the called terminal information included in the call request signal transmitted from the first MSC, and transmits the call request signal to a communication network formed by the detected service provider. A third MSC transmits the call request signal received from the second MSC to the called terminal so that the called terminal can communicate with the calling terminal over a communication network formed by the changed service provider.

Preferably, the system further comprises a subscriber management database (DB) for storing service change information including information on an initial service provider of the calling terminal and the called terminal, and information on a change in the service provider. The first MSC detects an initial service provider of the called terminal based on the service change information, and the second MSC determines whether a service of the called terminal is changed, based on the service change information. The service change information includes serial numbers of the calling terminal and the called terminal, a service provider change identification number, a service provider identification number, and a mobile identification number.

The first MSC detects the mobile identification number stored in the subscriber management DB, detects the service provider change identification number and the service provider identification number stored in association with the detected mobile identification number, and detects an initial service provider of the called terminal through the service provider change identification number and the service provider identification number. The second MSC determines whether a service provider of the called terminal is changed, based on the service provider change identification number.

To achieve the above and other objects, there is provided a method for providing a phone number maintaining service capable of allowing a user to continuously use a previously assigned phone number regardless of a change in service provider in a mobile communication system. The method comprises the steps of a) receiving a call request signal with calling terminal information and called terminal information, detecting an initial service provider of a called terminal from the called terminal information, and transmitting the call request signal to a communication network formed by the detected initial service provider of the called terminal; b) detecting a changed service provider of the called terminal based on the called terminal information included in the call request signal, and transmitting the call request signal to a communication network formed by the detected service provider; and c) transmitting the call request signal transmitted in the step b) to the called terminal so that the called terminal can communicate with the calling terminal over a communication network formed by the changed service provider.

Preferably, step a) further comprises the step of detecting an initial service provider of the called terminal based on service change information including information on an initial service provider of the calling terminal and the called terminal, and information on a change in the service provider, and step b) further comprises the step of determining whether a service of the called terminal is changed, based on the service change information.

To achieve the above and other objects, there is provided a mobile terminal for receiving a phone number maintaining service capable of allowing a user to continuously use a previously assigned phone number regardless of a change in service provider. The mobile terminal includes a memory for storing NAM (Number Assignment Module) information for receiving the phone number maintaining service, and a key input module having a plurality of keys, for generating a call request signal input by the user; an RF (Radio Frequency) module for transmitting and receiving a call request signal including called terminal information and calling terminal information; a display for displaying a phone number of a calling terminal, determined from the received calling terminal information; and a controller for transmitting the call request signal to a called terminal through the RF module, and upon receiving a call request signal through the RF module, determining a phone number of the calling terminal from the calling terminal information included in the received call request signal.

The NAM information includes a service provider change identification number, a service provider identification number and a mobile identification number, for receiving a mobile communication service. The service provider change identification number is updated in the memory each time a service provider to which the mobile terminal has subscribed is changed.

Preferably, the controller detects the service provider change identification number from the calling terminal information, determines a changed service provider identification number based on the detected service provider change identification number, and determines a phone number of the calling terminal by combining the changed service provider identification number with the mobile identification number included in the calling terminal information.

Preferably, the service provider change identification number has two digits. Of the two digits, a first digit indicates addition or subtraction on the service provider identification number and a second digit indicates a weight for performing addition or subtraction on the service provider identification number. Preferably, if a value of the first digit of the service provider change identification number is "0," the first digit indicates addition on the service provider identification number, and if a value of the first digit of the service provider change identification number is "1," the first digit indicates subtraction on the service provider identification number.

The controller determines the changed service provider identification number by adding a value of the second digit of the service provider change identification number to the service provider identification number, if the first digit value of the service provider change identification number is "0." Alternatively, the controller determines the changed service provider identification number by subtracting a value of the second digit of the service provider change identification number from the service provider identification number, if the first digit value of the service provider change identification number is "1."

BRIEF DESCRIPTION OF THE DRAWINGS

The above and other objects, features and advantages of the present invention will become more apparent from the following detailed description when taken in conjunction with the accompanying drawings in which:

FIG. 4 illustrates an example of a lookup table stored in the subscriber management data base of FIG. 1.

DETAILED DESCRIPTION OF THE PREFERRED EMBODIMENT

Figure 1:
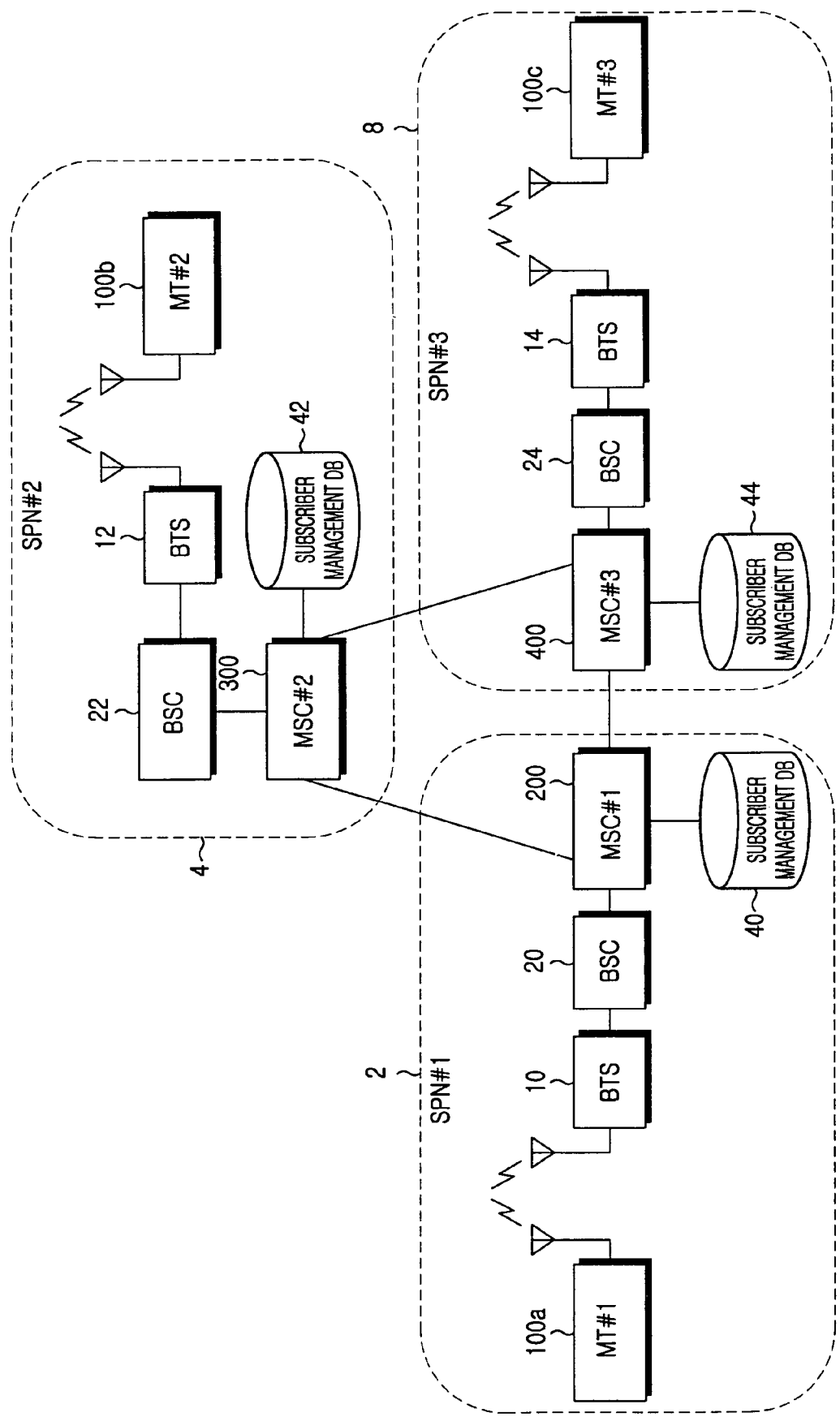
FIG. 1 is a block diagram illustrating a mobile communication system according to an embodiment of the present invention is applied.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Herein, a method for allowing a mobile subscriber (or user) to continuously use a previously assigned phone number in spite of a change in service provider will be referred to as "phone number maintaining service."

FIG. 1 is a block diagram illustrating a mobile communication system for providing a phone number maintaining service according to an embodiment of the present invention. In FIG. 1, reference numerals 2, 4 and 8 represent service provider networks managed by associated service providers that provide their unique mobile communication services. Specifically, reference numeral 2 represents a first service provider network SPN#1 managed by a first service provider, reference numeral 4 represents a second service provider network SPN#2 managed by a second service provider, and reference numeral 8 represents a third service provider network SPN#3 managed by a third service provider.

The first service provider network 2 includes a first mobile terminal (MT) 100*a*, a base station transceiver subsystem (BTS) 10, a base station controller (BSC) 20, a first mobile switching center (MSC) 200, and a subscriber management database (DB) 40. The first mobile terminal 100*a* has its own unique number (or phone number), and has subscribed to the first service provider. The BTS 10, a radio station, manages radio communication with the first mobile terminal 100. For this, the BTS 10 exchanges radio signals with the first mobile station 100*a* over the air. The BSC 20, interposed between the first MSC 200 and the BTS 10, controls an operation of the BTS 10 and manages radio resources. Further, the BSC 20 performs handoff between the BTS 10 and the BSC 20. The first MSC 200 stores a position and a service profile of the first mobile terminal 100*a*, and connects a traffic channel for communication among mobile terminals 100*a*, 100*b* and 100*c* by call switching. The subscriber management DB 40 connected to the first MSC 200 includes a high-capacity real-time database. The subscriber management DB 40 previously stores information necessary for a call between mobile terminals in a mobile communication system, and outputs the stored information under the control of the first MSC 200. Further, the subscriber management DB 40 stores service change information including information on a change in service provider of the first mobile terminal 100*a* for the phone number maintaining service according to an embodiment of the present invention. The service change information can be stored in a lookup table prepared in the subscriber management DB 40 in association with a phone number previously assigned to the first mobile terminal 100*a* and the change in service provider.

The second service provider network 4 and the third service provider network 8, mobile communication networks managed by different service providers that provide their unique mobile communication services, have the same structure as the first service provider network 2, and perform their own unique services set up by the corresponding service providers.

Figure 2:
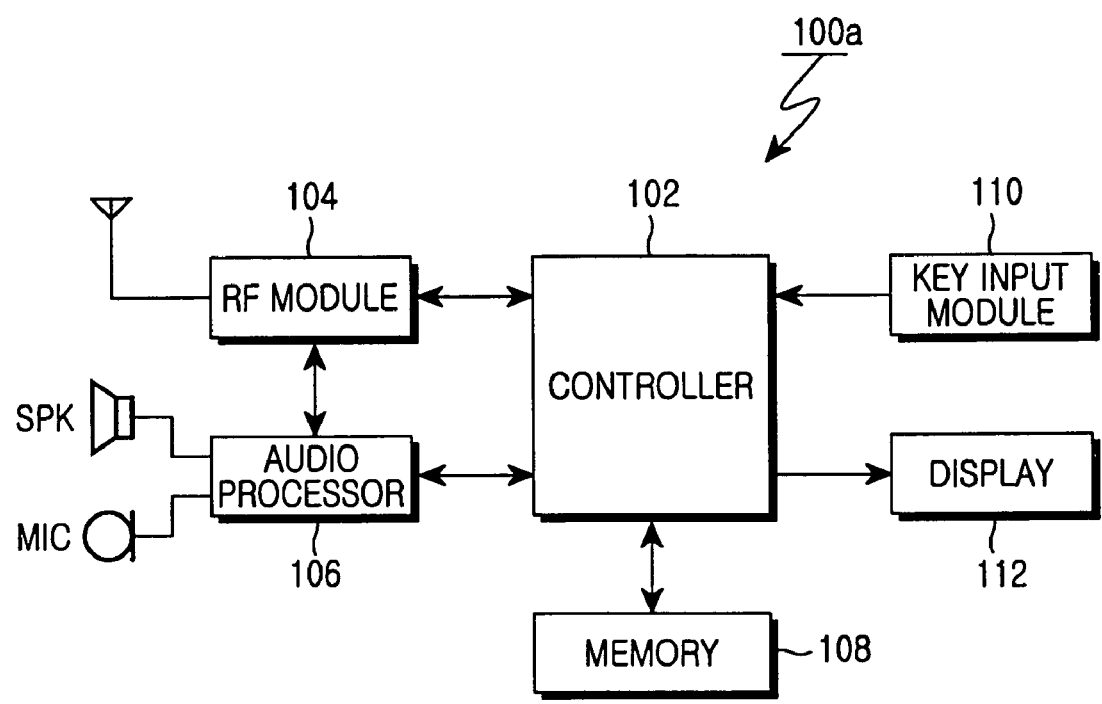
FIG. 2 is a block diagram illustrating a detained structure of the first mobile terminal illustrated in FIG. 1.

FIG. 2 is a block diagram illustrating a detailed structure of the first mobile terminal 100*a* illustrated in FIG. 1. For simplicity, a description of a mobile terminal will be made with reference to the first mobile terminal 100*a* only, and mobile terminals 100*b* and 100*c* are similarly configured. An operation of the first mobile terminal 100*a*, described herein below according to an embodiment of the present invention, can be applied in the same way to the second mobile terminal 100*b* and the third mobile terminal 100*c*.

Referring to FIG. 2, a memory 108 includes a program memory for storing program data necessary for controlling the operation of the mobile terminal 100*a*, and a data memory for storing data generated while controlling the operation of the mobile terminal 100*a*. Generally, the memory 108 stores NAM (Number Assignment Module) information based on which the mobile terminal 100*a* performs a mobile communication service provided from a corresponding service provider. The NAM information includes a mobile identification number (MIN) and a service provider identification number (SPID). The mobile identification number is assigned by the service provider to uniquely identify the mobile terminal 100*a*, and the service provider identification number is used by the mobile terminal 100*a* to identify the service provider that provides a corresponding mobile communication service through the assigned mobile identification number. According to an embodiment of the present invention, the NAM information stored in the memory 108 includes service change identification number together with the mobile identification number and the service provider identification number. The service change identification number is information newly added to identify a changed (new) service provider, in the case where the current service provider of the mobile terminal 100*a* is changed. That is, the NAM information stored in the memory 108 includes the service change identification number, the service provider identification number, and the mobile identification number.

A controller 102 controls the overall operation of the mobile terminal 100*a*. Particularly, upon receiving a call request, the controller 102 performs a control operation of transmitting the NAM information stored in the memory 108, including the service change identification number, service provider identification number and mobile identification number. An RF (Radio Frequency) module 104 controls transmission and reception of the NAM information, audio data, control data, and other data. An audio processor 106, under the control of the controller 102, converts audio data provided from the RF module 104 into an audible sound through a speaker (SPK). Alternatively, the audio processor 106 converts an audio signal picked up by a microphone (MIC) into audio data and provides the audio data to the RF module 104. A key input module 110 includes a plurality of alphanumeric keys and function keys, and provides the controller 102 with key input data corresponding to a particular key pressed by the user. Therefore, the user can dial a phone number of another party (or called party) and then send a call request by using the alphanumeric keys and function keys arranged in the key input module 110. A display 112, under the controller 102, can display a phone number of a calling mobile terminal or a called mobile terminal.

In the embodiment of the present invention, the memory 108 stores NAM information upon which the mobile terminal 100*a* performs a mobile phone service. The NAM information includes a mobile identification number used by a service provider that provides the mobile phone service, a service provider identification number indicating a selected service provider, and a service provider change identification number indicating whether a service provider of the user is changed. The NAM information, as an example, can be stored in the memory 108 in the format of Table 1 below.

TABLE 1

| A | B | C |
|---|---|---|
| ab | cde | fghi-jklm |

In Table 1, 'A' denotes a service provider change identification number, 'B' denotes a service provider identification number, and 'C' denotes a mobile identification number.

Namely, the NAM information can be stored in the memory 108 in the numeric format of "ab-cde-fghi-jklm." Here, the number "ab" represents the subscriber provider change identification number A, the number "cde" represents the service provider identification number B, and the number "fghi-jklm" represents the mobile identification number C.

In particular, the service provider change identification number A is information for representing a service provider identification number of a changed service provider, in the case where the service provider of the mobile terminal 100*a* is changed. The service provider change identification number A is updated each time a service provider of the mobile terminal 100*a* is changed.

If a user initially subscribes to a mobile communication service, the service provider change identification number "ab" of the NAM information stored in the mobile terminal is assigned "00." The service provider change identification number of "00" means that the user has never changed the service provider after he or she initially subscribed to the mobile communication service.

A description of the embodiment will now be made with reference to the case where the NAM information stored in the mobile terminal is "00-011-1234-5678." Here, the service provider change identification number A of "00" indicates that the user has never changed the service provider after he or she initially subscribed to the mobile communication service. The service provider identification number B of "011" indicates that a service provider identification number B of the service provider that provides a mobile phone service is assigned "011." In addition, "1234-5678" indicates a mobile identification number C assigned by the service provider with the service provider identification number "011."

When a user of the mobile terminal with NAM information stored therein changes a service provider, the NAM information is updated. For example, if a mobile terminal with NAM information of "00-011-1234-5678" stored therein changes the current service provider with a service provider identification number B of "011" to a new service provider with a service provider identification number B of "016," the NAM information stored in the mobile terminal will be updated as "05-011-1234-5678." Here, "05" represents the service provider change identification number A, and "05-011" represents a changed service provider identification number B'.

If a value of the first digit of the service provider change identification number A is "0," it means addition, and if the value is "1," it means subtraction. The subjects for addition and subtraction are a second digit value of the service provider change identification number A, and the service provider identification number B. For example, if a first digit value of the service provider change identification number A is "0," the mobile terminal adds the second digit value of the service provider change identification number A to the service provider identification number B thereby determining a changed service provider identification number B'. Alternatively, if the second digit value of the service provider change identification number A is "1," the mobile terminal subtracts the second digit value of the service provider change identification number A from the service provider identification number B thereby determining a changed service provider identification number B'.

Figure 3:
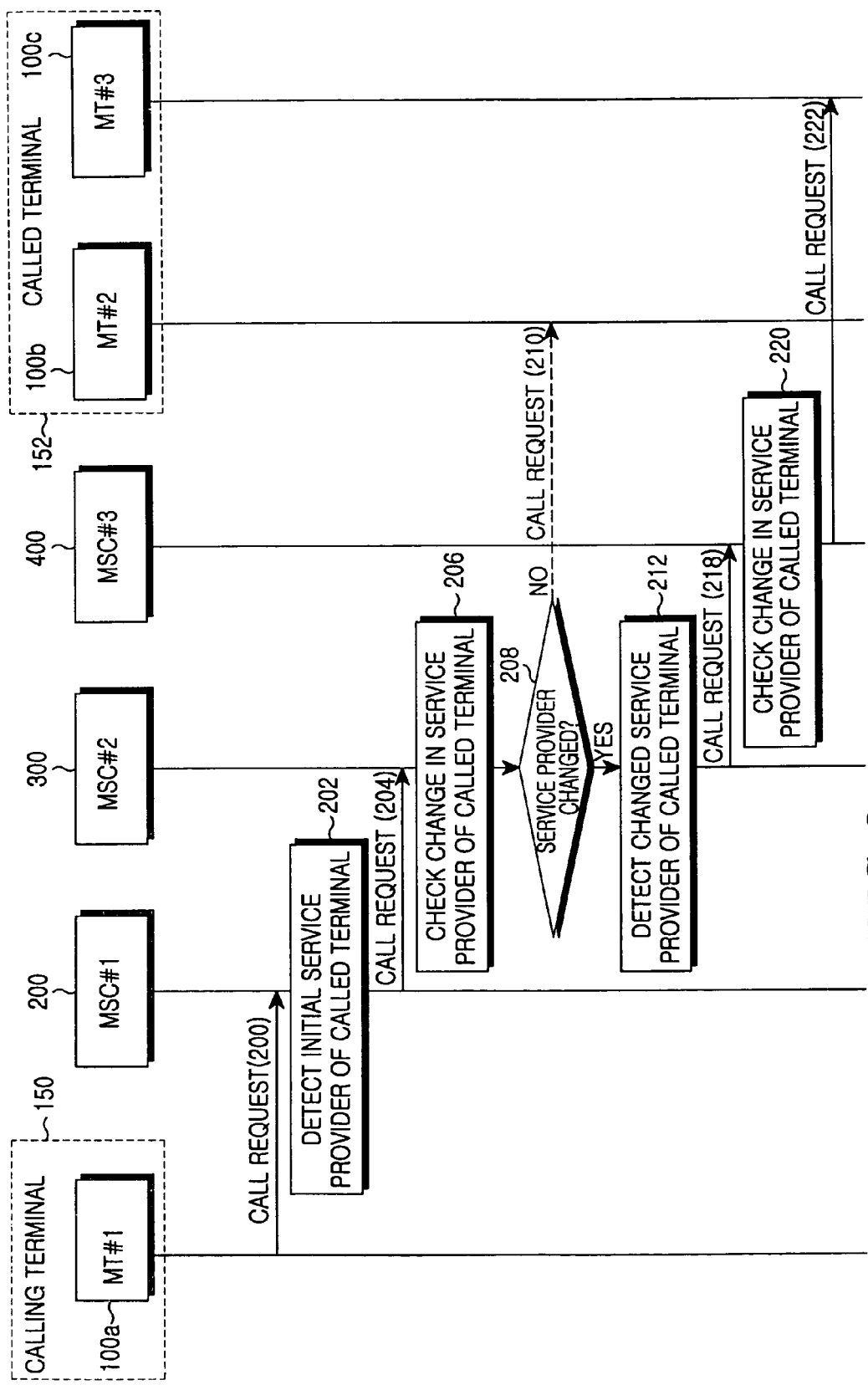
FIG. 3 is a flowchart illustrating a method for allowing a user to continuously use a previously assigned phone number regardless of a change in service provider in a mobile communication system according to an embodiment of the present invention.

FIG. 3 is a flowchart illustrating a method for providing a phone number maintaining service regardless of a change in service provider in a mobile communication system according to an embodiment of the present invention. FIG. 4 illustrates an example of a lookup table prepared in the subscriber management DB 40 of FIG. 1 to provide a phone number maintaining service in a mobile communication system according to an embodiment of the present invention.

Now, with reference to FIGS. 1 to 4, a detailed description will be made of a method for providing a phone number maintaining service capable of allowing a user to continuously use an existing phone number in spite of a change in service provider in a mobile communication system according to an embodiment of the present invention.

In the embodiment of the present invention, the first mobile terminal (MT#1) 100a subscribing to the first service provider network 2 managed by a service provider (hereinafter referred to as "first service provider") providing a first service will be referred to as a "calling terminal" 150, and the second and third mobile terminals 100b and 100c receiving a call request from the calling terminal 150 will be referred to as a "called terminal" 152.

If the called terminal 152 has subscribed to the second service provider network 4 managed by a second service provider, the second mobile terminal (MT#2) 100b serves as the called terminal 152. Alternatively, if the called terminal 152 has subscribed to the third service provider network 8 managed by a third service provider, the third mobile terminal (MT#3) 100c serves as the called terminal 152.

The embodiment of the present invention will now be described on the assumption that the NAM information stored in the first mobile terminal 100a is "18-019-723-9553," a service provider identification number B of the first service provider is "011," a service provider identification number B of the second service provider is "016," and a service provider identification number B of the third service provider is "017."

If a call connection request is received from a user, the first mobile terminal 100a transmits a call request signal corresponding to a phone number input by the user to the first MSC (MSC#1) 200 in step 200. Specifically, if the user inputs a phone number "016-9530-6398" by selecting corresponding keys prepared in the key input module 110 and then selects a Send key corresponding to the call connection request, the first mobile terminal 100a transmits a call connection request signal to the first MSC 200. That is, upon receiving a call connection request signal, the first mobile terminal 100a adds a service provider change identification number A of "00" to the input phone number "016-9530-6398." The first mobile terminal 100a transmits to the first MSC 200 a call request signal with called terminal information "00-016-9530-6398" determined by adding the service provider change identification number A of "00" to the phone number "016-9530-6398." At this point (step 200), the first mobile terminal 100a transmits the call request signal together with NAM information "18-019-723-9553," i.e., calling terminal information, stored in the memory 108. The call request signal including the calling terminal information, i.e., NAM information of the first mobile terminal 100a, and the called terminal information is transmitted to the first MSC 200 through the BTS 10 and the BSC 20.

Upon receiving the call request signal with the calling terminal information and the called terminal information from the BSC 20, the first MSC 200 detects in step 202 an initial service provider to which the called mobile terminal initially subscribed (Step 202). In the embodiment of the present invention, it is assumed that an initial service provider of the called mobile terminal, detected by the first MSC 200, is the second service provider.

If the initial service provider of the called mobile terminal is detected as the second service provider as stated above, the first MSC 200 transmits in step 204 a call request signal with calling terminal information of the first mobile terminal 100a and the called terminal information to the second MSC (MSC#2) 300 of the second service provider network 4.

Upon receiving the call request signal with the calling terminal information of the first mobile terminal 100a and the called terminal information, the second MSC 300 checks service provider change information of the called terminal based on the called terminal information in step 206. Specifically, the second MSC 300 checks service provider change information of the called terminal based on the lookup table 50.

As illustrated in FIG. 4, service change information in the lookup table 50 includes serial number K, service provider change identification numbers (SPCIDs) A, service provider identification numbers (SPIDs) B, and mobile identification numbers (MINs) C for the mobile terminals. The lookup table 50 is stored in the subscriber management DBs 40, 42 and 44. The second MSC 300 detects a mobile identification number of the called mobile terminal from the mobile identification numbers C in the lookup table 50 based on the called terminal information included in the received call request signal. If a mobile identification number of the called terminal is detected, the second MSC 300 detects a service provider change identification number and a service provider identification number, both associated with the detected mobile identification number, from the service provider change identification numbers A and the service provider identification numbers B in the lookup table 50, thereby to determine in step 208 whether a service provider of the called terminal is changed.

Preferably, if the service provider change identification number corresponding to the detected mobile identification number is "00," the second MSC 300 proceeds to step 210, determining that the initial service provider of the called terminal is not changed. In step 210, the second MSC 300 transmits a call request signal to the second mobile terminal 100b along with called terminal information from the first mobile terminal 100a. Upon receiving the call request signal with the called terminal information, the second mobile terminal 100b generates an alarm in reply to the call request signal, and detects a phone number of the first mobile terminal 100a from the received NAM information, i.e., calling terminal information, of the first mobile terminal 100a. If a first digit value of the service provider change identification number included in the calling terminal information is "0," the second mobile terminal 100b displays on its screen (i) a value determined by adding a second digit value of the service provider change identification number to a service provide identification number of the calling terminal information, and (ii) the mobile identification number of the calling terminal information. If, however, the first digit value of the service provider change identification number is "1," the second mobile terminal 100b displays on its screen (i) a value determined by subtracting a second digit value of the service provider change identification number from the service provider identification number, and (ii) the mobile identification number of the calling terminal information.

According to the embodiment of the present invention, in the case where the calling terminal information of the first mobile terminal 100a is "18-019-723-9553," since the first digit value of the service provider change identification number is "1," the second mobile terminal 100b subtracts a second digit value "8" of the service provider change identification number "18" from the service provider identification number "019." Thereafter, the second mobile terminal 100b displays on the display 112 (i) a value "011" (=019–8) determined by subtracting the second digit value "8" of the service provider change identification number from the service provider identification number "019," and (ii) the mobile identification number "723-9553." As a result, the phone number of the calling terminal, displayed on the display 112, becomes "011-723-9553."

If the service provider change identification number detected in association with the mobile identification number is not "00," the second MSC 300 proceeds to step 212, determining that a service provider of the called terminal is changed. In step 212, the second MSC 300 detects a changed (new) service provider of the called mobile terminal. Specifically, the second MSC 300 detects a changed service provider of the called mobile terminal based on the lookup table 50 stored in the subscriber management DB 42.

That is, the second MSC 300 detects a mobile identification number corresponding to called terminal information from the mobile identification numbers C in the lookup table 50, and detects a service provider change identification number and a service provider identification number of the called mobile terminal based on the detected mobile identification number. In this way, the second MSC 300 can detect a changed service provider for the called mobile terminal.

The embodiment of the present invention will now be described with reference to a case where a changed service provider of the called mobile terminal is recognized as the third service provider by the second MSC 300.

The second MSC 300 proceeds to step 218 after detecting a changed service provider, i.e., the third service provider, of the called mobile terminal. In step 218, the second MSC 300 transmits to the third MSC (MSC#3) 400 a call request signal with called terminal information and NAM information, i.e., calling terminal information, of the first mobile terminal 100a.

Upon receiving the call request signal with the called terminal information and the calling terminal information of the first mobile terminal 100a, the third MSC 400 determine in step 220 whether a service provider of the called mobile terminal is changed, based on the called terminal information. That is, the third MSC 400 determines whether a called mobile terminal has subscribed to the third service provider network 8, based on the lookup table 50 stored in the subscriber management DB 44. If it is determined that the called mobile terminal has subscribed to the third service provider network 8, the third MSC 400 delivers to the BSC 24 a call request signal with NAM information, i.e., 18-019-723-9553," of the first mobile terminal 100a in step 222. The BSC 24 transmits the call request signal with the NAM information "18-019-723-9553" of the first mobile terminal 100a to the third mobile terminal 100c via the BTS 14.

Upon receiving the call request signal with the NAM information "18-019-723-9553 of the first mobile terminal 100a, the third mobile terminal 100c generates an alert or vibration to inform the user of termination of a call. In addition, the third mobile terminal 100c recognizes "18-019" of the NAM information "18-019-723-9553" of the first mobile terminal 100a as "011" (=019–8), and displays an actual phone number, i.e., calling party's number "011-723-9553," of the first mobile terminal 100a on the display 112.

As described above, the present invention stores NAM information including service provider change identification number indicating a change in service provider in a memory of the mobile terminal and stores service change information in the subscriber management DB, to set up a call over a changed service provider network in response to a call request signal. In this way, a user can continuously use an existing phone number in spite of a change in service provider.

In addition, the present invention provides a simple phone number maintaining service capable of allowing the user to continuously use an existing phone number in spite of a change in service provider, by simply adding a service provider change identification number to the existing phone number.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile terminal for receiving a phone number maintaining service capable of allowing a user to continue to use a previously assigned phone number regardless of a change in service provider, the terminal comprising:

a memory for storing NAM (Number Assignment Module) information for receiving the phone number maintaining service;

wherein the NAM information includes a service provider change identification number, a service provider identification number and a mobile identification number, for receiving a mobile communication service;

the service provider change identification number is updated in the memory each time a service provider to which the mobile terminal has subscribed is changed;

a key input module having a plurality of keys, for generating a call request signal input by the user;

an RF (Radio Frequency) module for transmitting and receiving a call request signal including called terminal information and calling terminal information;

a display for displaying a phone number of a calling terminal, determined from the received calling terminal information; and a controller for transmitting the call request signal to a called terminal through the RF module, and upon receiving a call request signal through the RF module, determining a phone number of the calling terminal from the calling terminal information included in the received call request signal;

wherein the controller determines the service provider change identification number from the calling terminal information, determines a changed service provider identification number based on the detected service provider change identification number, and determines a phone number of the calling terminal by combining the changed service provider identification number with the mobile identification number included in the calling terminal information; and the service provider change identification number has two digits, a first digit indicates addition or subtraction on the service provider identification number and a second digit indicates a weight for performing addition or subtraction on the service provider identification number.

2. The mobile terminal of claim 1, wherein if a value of the first digit of the service provider change identification number is "0," the first digit indicates addition on the service provider identification number, and if a value of the first digit of the service provider change identification number is "1," the first digit indicates subtraction on the service provider identification number.

3. The mobile terminal of claim 1, wherein the controller calculates the changed service provider identification number by adding a value of the second digit of the service provider change identification number to the service provider identification number, if the first digit value of the service provider change identification number is "0."

4. The mobile terminal of claim 1, wherein the controller calculates the changed service provider identification number by subtracting a value of the second digit of the service provider change identification number from the service provider identification number, if the first digit value of the service provider change identification number is "1."

* * * * *